Sept. 2, 1969  W. H. STANGE  3,464,504
VEHICLE MOUNTED SOIL SAMPLING DEVICE
Filed Sept. 26, 1968  6 Sheets-Sheet 1

INVENTOR.
WILFRED H. STANGE
BY *Joseph G. Werner*
*John M. Winter*
ATTORNEYS

Sept. 2, 1969 W. H. STANGE 3,464,504
VEHICLE MOUNTED SOIL SAMPLING DEVICE
Filed Sept. 26, 1968 6 Sheets-Sheet 2

INVENTOR.
WILFRED H. STANGE
BY Joseph G. Werner
John W. Winter
ATTORNEYS

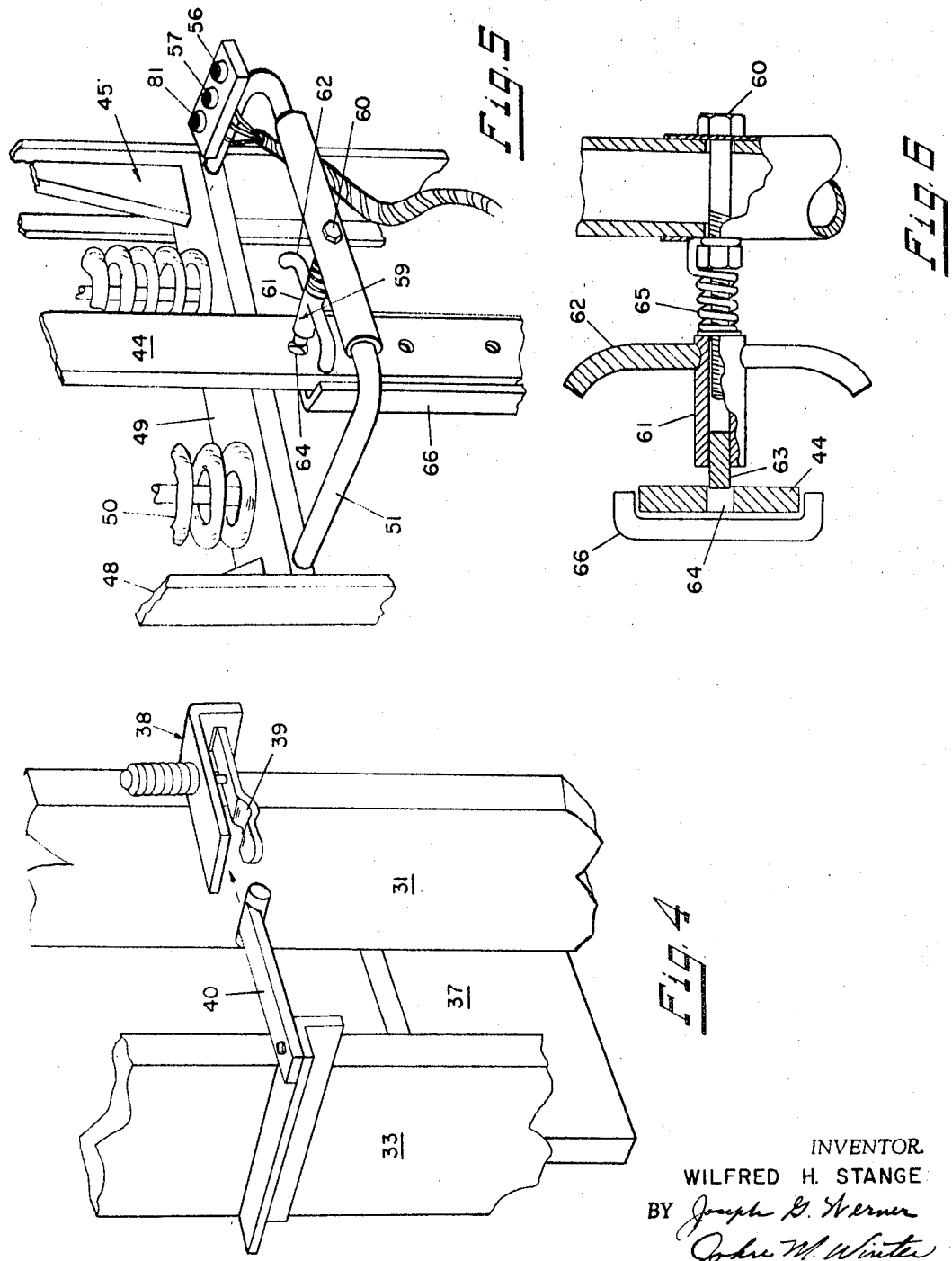

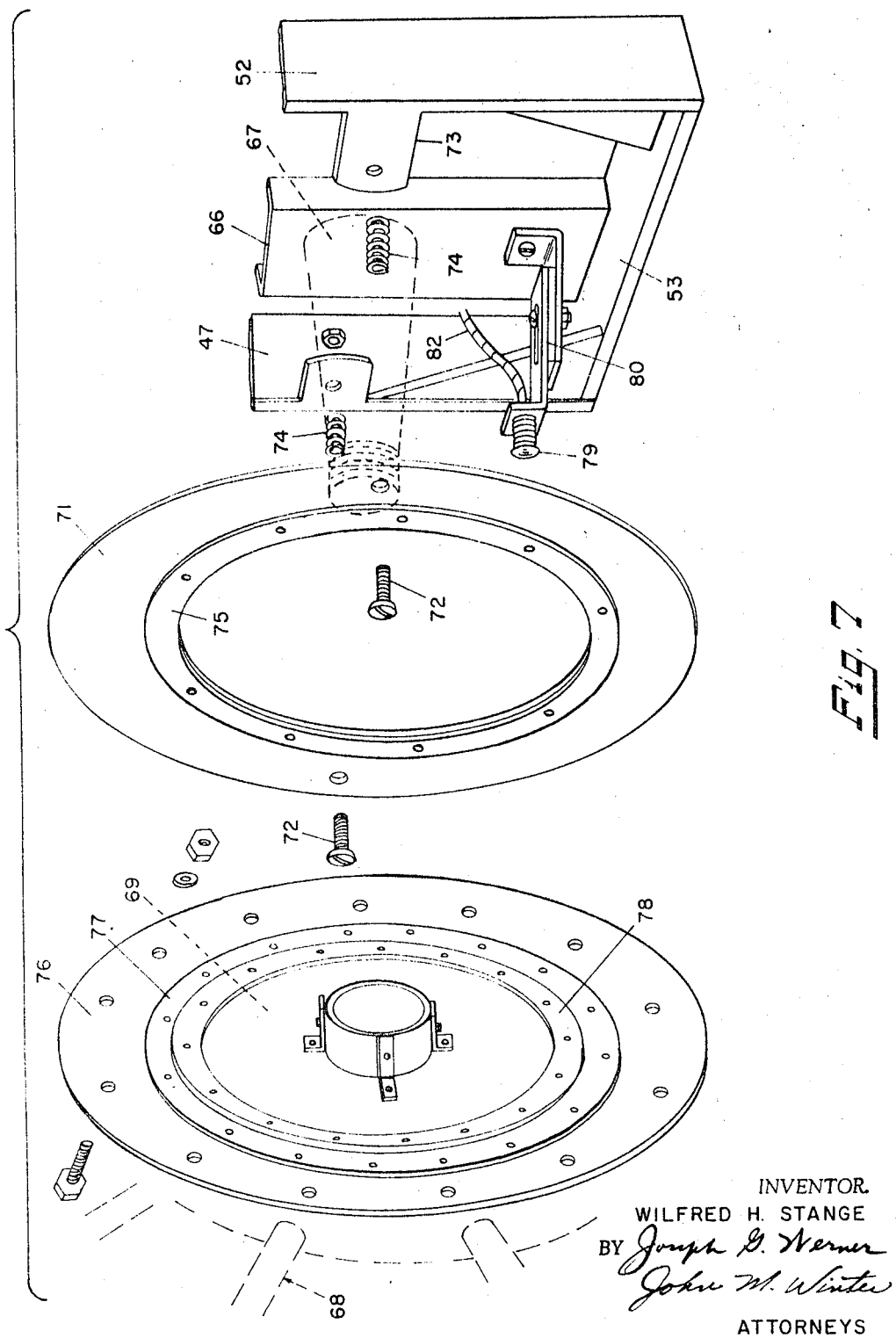

INVENTOR.
WILFRED H. STANGE

United States Patent Office

3,464,504
Patented Sept. 2, 1969

3,464,504
VEHICLE MOUNTED SOIL SAMPLING DEVICE
Wilfred H. Stange, Rte. 2, Box 206,
New Lisbon, Wis. 53950
Filed Sept. 26, 1968, Ser. No. 762,862
Int. Cl. E21c *11/02, 5/08*
U.S. Cl. 173—28      10 Claims

ABSTRACT OF THE DISCLOSURE

A soil sampling device having a frame for mounting on the chassis of a truck adjacent the cab thereof for pivotable movement to and from an operating position generally parallel to the path of travel of the truck. A vertically reciprocal carriage assembly is mounted in the frame and has an upper spring-supported carriage and a lower carriage supported from the upper carriage by a pair of hydraulic cylinders. The lower carriage has a large rotatable wheel mounted thereon which has at least one radially extending tubular earth probe. The probe may be forced into the soil manually or with the hydraulic cylinders and a motor is provided for rotating the probe. The tubular earth probe is attached to a transparent container box removably mounted on the wheel for receiving the core sample from the probe.

BACKGROUND OF THE INVENTION

Field of the invention

This invention relates to a vehicle mounted soil sample device having a penetrating tool which may be manually or power driven.

Description of the prior art

In modern farming practices it is customary to take relatively shallow soil samples at a plurality of locations over a given acreage to permit analysis of the soil makeup thereof. From such soil samples, chemical deficiencies can be determined and, thus, proper fertilization undertaken.

An accurate report can only be made if it is based on an accurate and reliable composite soil sample taken from the soil strata. Unreliable sampling can result in misleading and inaccurate fertilizing recommendations, and consequently lower yields.

Furthermore, in order for a farmer to participate in many of the government farm programs, it is a prerequisite that the farmer have reliable soil samples taken on his acreage.

Under current practices about seven probes, approximately six inches deep, are taken at spaced locations for each five acres of land. This gives a good average soil sample for the acreage.

In the past, soil samples have been taken with a hand probe which was operated by a person walking over the area to be sampled. At selected locations the operator merely forced the probe into the ground. The probe was then pulled out of the ground and the core or soil sample extracted from the probe by suitable means and dumped into a sample bag. Quite obviously, this is a most strenuous, tiring and very time consuming method of sampling.

Accordingly, in recent years various power driven soil sampling devices have been designed for mounting on land vehicles such as cars, trucks, and the like. U.S. Patents, Wolpert 2,709,368 (1955), Boxrud 3,264,877 (1966), Clark 3,324,958 (1967), and Boxrud 3,331,249 (1967) are representative of such vehicle mounted soil sampling devices.

Each of the above known devices has one or more of the following shortcomings. The sampling operation may not be conducted in it entirety from the driver's seat of the vehicle on which the sampling device is mounted. The devices are only designed for manual or power operation, but not both. The operator's vision at the exact point of the probe is often obstructed. The structure of the vehicle must be altered to permit mounting of the sampling device and interferes with the normal functioning of the vehicle. The sampling device would be damaged or broken should the vehicle be inadvertently moved when the probe is in the ground.

SUMMARY OF THE INVENTION

Basically, my invention comprises a vehicle mounted soil sampling device having the sampling probe mounted on a large, rotatable and vertically reciprocal wheel adjacent the cab of the supporting vehicle whereby the entire sampling operation, including probing, extraction and bagging of the sample can be quickly and expeditiously performed by the driver of the vehicle from the driver's seat.

The vertically reciprocal carriage on which the probe carrying wheel is mounted is a two part assembly permitting either manual or power operation as the soil conditions dictate.

My sampling device greatly reduces the time required for taking soil samples because the sample container box communicating with the probe for receiving the several cores which make up the total soil sample may be quickly removed and emptied into the sampling bag from the driver's seat.

The large rotatable wheel is mounted on a reciprocal carriage which may be forced downwardly by hand pressure and lifted or bounced back by springs for quick sampling in soft soil or it can be driven down and lifted with a piston and cylinder arrangement for sampling in hard soil conditions. Power means are also provided for rotating the probe in boring fashion for penetrating vary hard soil.

The frame on which the reciprocal carriage assembly and rotatable wheel are mounted extends along the side of the cab of the supporting vehicle for easy operation of the sampling device from the driver's seat. The frame is pivotable about a forward pivot connection for swinging it horizontally out of the way of the door on the driver's side of the vehicle to permit ingress and egress from the driver's seat.

Furthermore, the vehicle on which my soil sampling device is mounted does not have to be structurally altered in any manner and the device does not hamper the normal functioning and travel of the vehicle.

The soil sampling device is mounted externally of the vehicle adjacent to the driver's side of the cab permits the driver of the vehicle to observe the exact point of probing at all times during operation. It is important that the operator be able to observe the exact point of penetration to avoid damaging the probe on surface rocks and prevent the boring down onto foreign matter, such as corn stalks, or the like which would result in inaccurate sampling.

The earth probe, being mounted on the rotatable wheel, not only permits the complete operation to be conducted from the driver's seat but also provides a safety factor for the device by preventing damage should the vehicle accidentally roll forward or backward when the probe is in the ground or should the vehicle be driven away inadvertently while the probe is in the ground. In fact, under certain conditions, samples may actually be taken by positioning the wheel so that the probe is pointing upwardly or forwardly and then lowering the wheel and allowing it to run on the ground until the proble engages the soil and is lifted out of the ground and the wheel is revolved further and then raised by the spring assembly. The wheel is then lowered again as the vehicle approaches the next probing location. This manner of sampling is, of course, very fast, but obviously, should only be employed in soft soil conditions.

The peripheral rim of the probe mounting wheel acts as a limiting guide so that each probe is made to exactly the same depth whereby given sized samples may be obtained.

Other objects, features and advantages of my invention will be apparent from the following detailed description taken in conjunction with the accompanying drawings showing a preferred embodiment exemplifying the principles of my invention.

BRIEF DESCRIPTION OF THE DRAWINGS

FIGURE 4 is a fragmentary perspective view of the detent arrangement for releasably holding the frame in operative position.

FIGURE 5 is a fragmentary perspective view showing the operating handle and vertical adjustment mechanism of the soil sampling device.

FIGURE 6 is a detail view, partially in section, showing the vertical adjustment mechanism of FIGURE 5.

FIGURE 7 is an exploded perspective view showing the lower reciprocal carriage and friction drag or braking apparatus.

DESCRIPTION OF A PREFERRED EMBODIMENT

Figure 1:
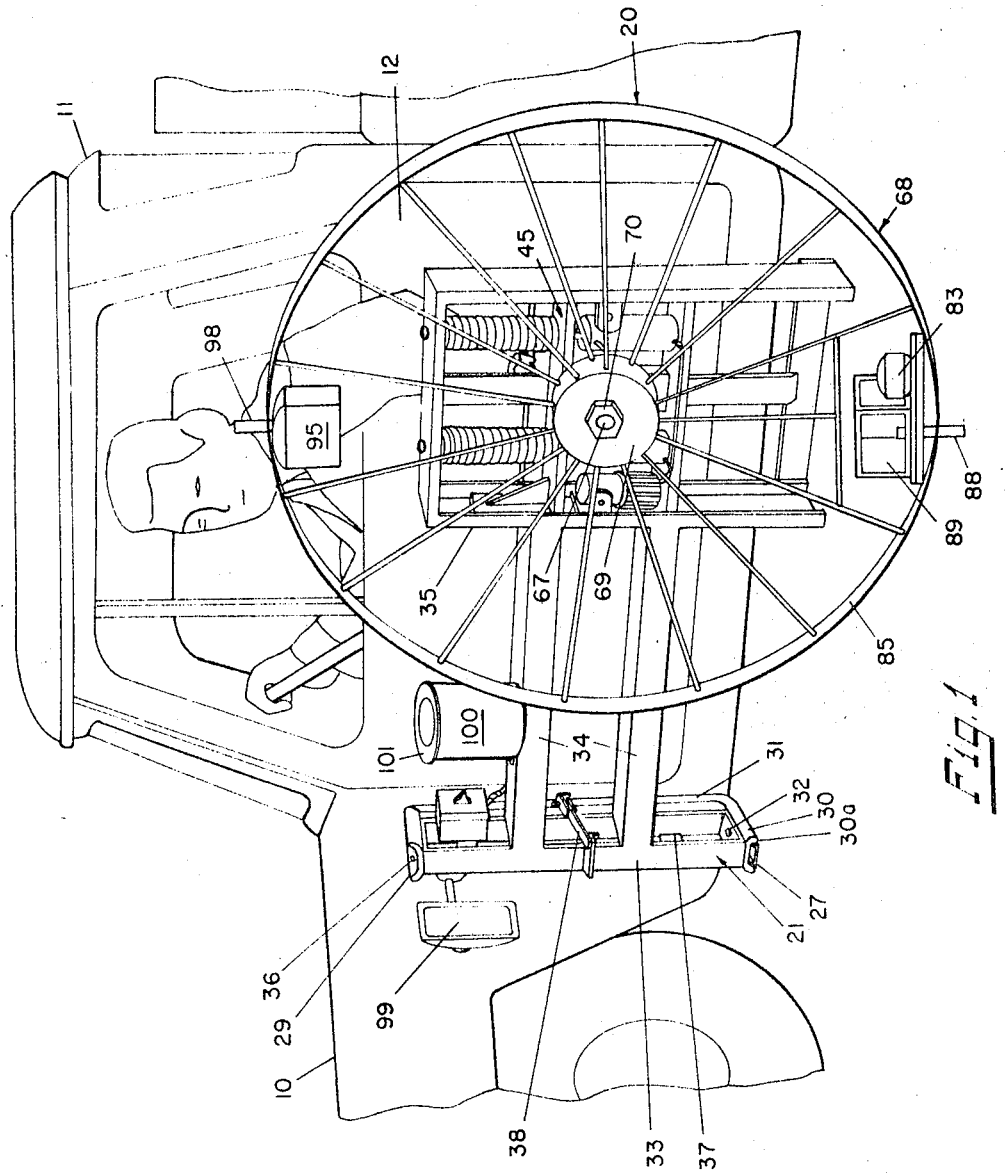
FIGURE 1 is a side perspective view of my soil sampling device mounted on a pick-up truck.
Figure 2:
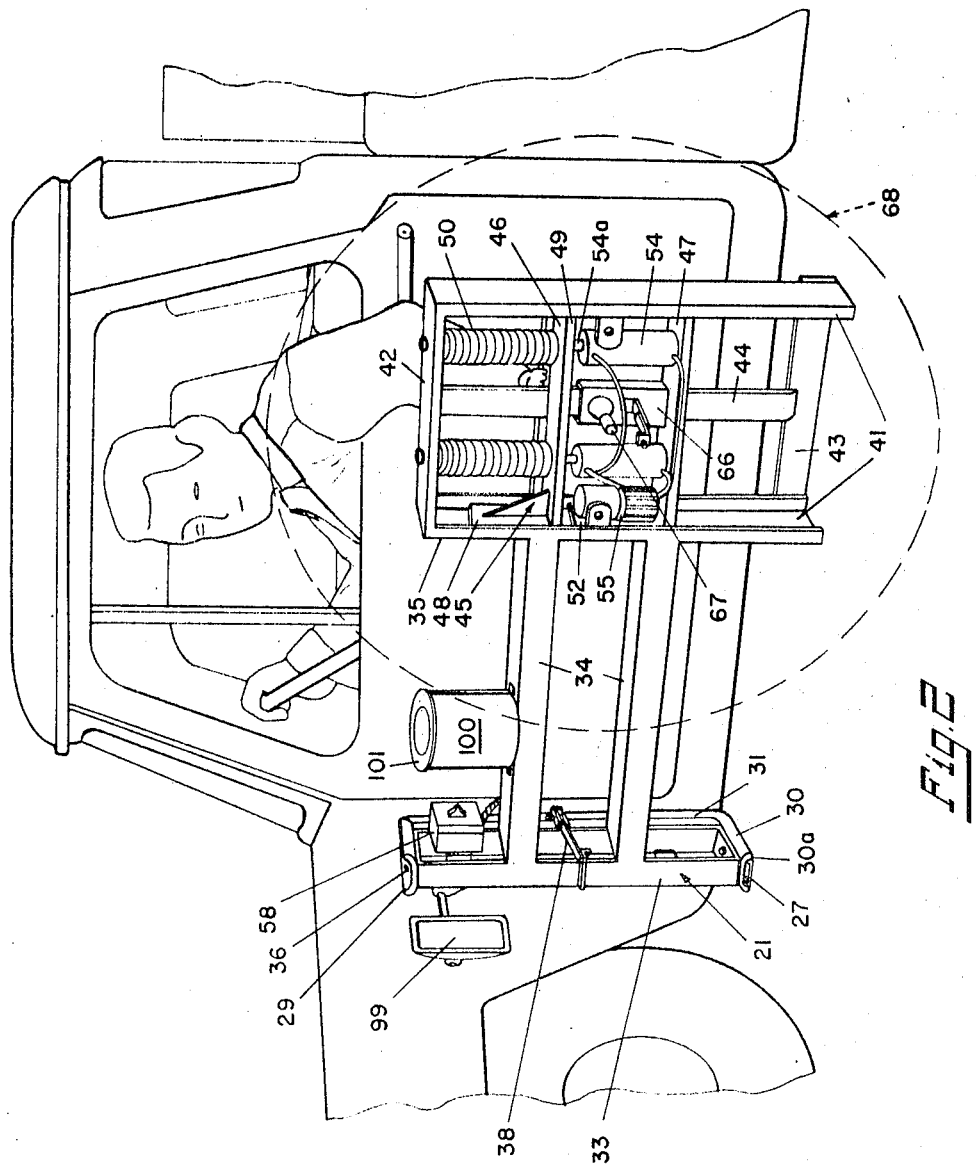
FIGURE 2 is a side perspective view similar to FIGURE 1 except that the large spoked wheel and other parts have been removed to illustrate the frame and carriage assembly.
Figure 3:
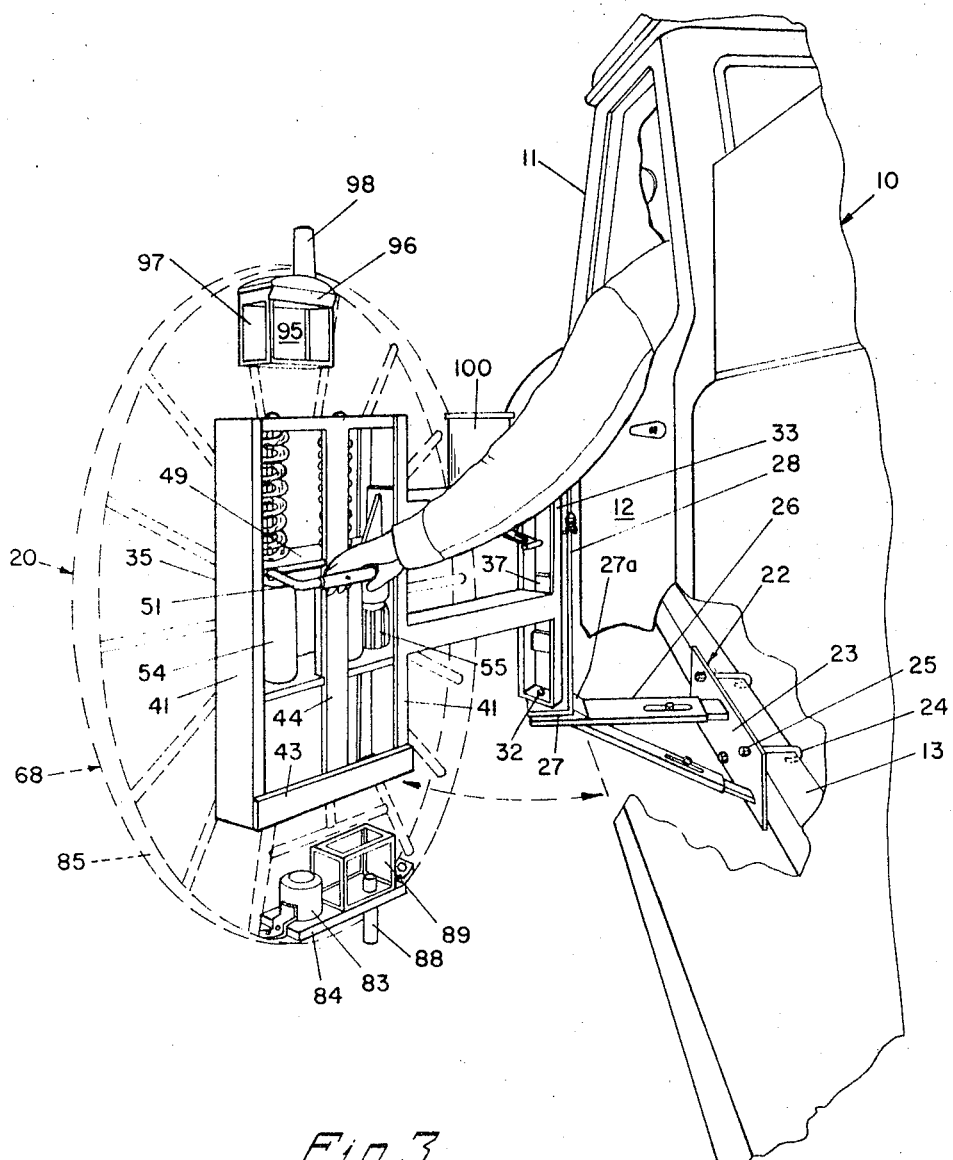
FIGURE 3 is a rear perspective view of my soil sampling device swung out of operating position to permit the door on the driver's side of the truck to be opened.

Referring now more particularly to the drawings wherein like reference numerals refer to like parts throughout the several views, as shown in FIGURES 1–3, my soil sampling apparatus is generally indicated by numeral 20 and the truck on which it is mounted for illustration is generally shown at 10. The truck cab is shown at 11 and the door on the driver's side thereof at 12.

The soil sampling device 20 has a steel frame generally indicated at 21. The frame has a mounting bracket 22 for supporting the device from the main channel beam 13 of the truck chassis. The mounting bracket portion of the frame 21 comprises a flat plate 23 with a plurality of clamping bolts 24 hooking around the chassis beam 13 of the truck and having threaded ends extending through plate 23 and secured by nuts 25. Mounting bracket 22 has adjustable tripod support arms shown at 26 in FIGURE 3 joining at a bearing plate 27. A generally C-shaped channel member 28 having laterally extending upper and lower arms 29 and 30 connected by an upright web 31 is mounted on bearing plate 27 by pin 32. Channel member 28 is held against rotation about pin 32 by the depending flanges 30a on lower arm 30 which fit over the sides of bearing plate 27 and by the raised flange 27a formed on the bearing plate.

The tripod support arms 26 are adjusted so that the bearing plate extends laterally outward beyond the truck body and the mounting bracket 22 is positioned so that the bearing plate 27 is located slightly forward of the hinged edge of the door of the truck.

The mounting bracket 22 is held securely in place by tightening nuts 25 on bolts 24 and may be removed by loosening these nuts. As is apparent from FIGURES 1–3 and the foregoing description, the truck or other land vehicle on which the soil sampling device may be used need not be structurally altered in anyway to facilitate mounting of the device. Furthermore, the adjustable tripod support arms permit use of the device with vehicles having various body styles.

The main portion of frame 21 has an upright mounting section 33, channel beams 34 extending rearwardly therefrom, and a rectangular shaped carriage housing 35 supported on the ends of beams 34.

The mounting section 33 of the frame is comprised of flat iron strips welded into a box-like structure shown in FIGURES 1–3. The frame is pivotably mounted in the C-shaped channel member 28 by pivot pins 32 and 36. The frame 21 is pivotable horizontally about pins 32 and 36 between an operating position substantially parallel to the path of travel of the truck, as shown in FIGURES 1 and 2, and an outer position, as shown in FIGURE 3, to facilitate ingress and egress from the door on the driver's side of cab. As shown in FIGURES 3 and 4, a stop plate 37 is welded on the web 31 of C-shaped channel 28 to limit the degree of horizontal swing permitted.

A detent mechanism 38, shown in FIGURES 1–4, releasably retains the frame 21 in operative position parallel to the side of the supporting vehicle. The detent has a spring biased female receptacle 39 mounted on the upright web 31 of channel member 28 for receiving and releasably retaining the male member 40 which is mounted on section 33 of the frame 21.

The soil sampling unit may be quickly unmounted from the supporting vehicle merely by removing pins 32 and 36, leaving just the mounting bracket portion 22 of the frame attached which does not interfere with the normal use of the vehicle. It may be desirable to also remove the mounting bracket 22 at the end of the testing season to prevent rusting and damage thereof during use of the truck during the winter months. As is clear from the foregoing, my soil sampling device does not interfere in any way with the normal operation of the truck and a portion or all of the device may be removed quickly and easily from the truck when desired.

As best seen in FIGURES 1 and 2, horizontal channel beams 34 are of such a length as to support the carriage housing portion 35 of the frame 21 directly opposite the driver's seat of the truck 10 for easy access from the window of the cab.

Referring now to FIGURES 2 and 3, carriage housing 35 comprises a pair of opposed upright side channels 41 connected by a top member 42 and a bottom cross member 43. A vertical guide plate 44 is welded to the top and bottom cross members midway between the side channels.

A carriage assembly generally indicated by reference numeral 45 is mounted for vertical reciprocal movement in side channels 41 which provide carriage tracks therefor. The carriage assembly is comprised of an upper assembly 46 and a lower assembly 47. The upper carriage 46 is the hand operated unit while the lower carriage is power driven.

The upper carriage assembly 46 is generally U-shaped and has a pair of side runners 48 rigidly connected at their lower ends by a cross plate 49. The side runners 48 are slidably engaged in the carriage tracks provided by the upright side channels 41 of the carriage housing. The upper carriage is resiliently supported in the carriage housing by a pair of springs 50 bolted to top member 42 of the housing and to cross plate 49.

As shown in FIGURES 3 and 5, a substantially horizontal handle bar 51 is fixedly attached to the inside of the upper carriage assembly at the ends of cross plate 49.

Referring to FIGURES 2, 3 and 7, the lower carriage assembly 47, like upper assembly 46, is also generally U-shaped and has a pair of side runners 52 rigidly connected at their lower ends by a cross plate 53. Like the side runners 48 of the upper carriage assembly, side runners 52 of the lower assembly are also slidably engaged in the carriage tracks provided by channels 41. The lower carriage is supported in the carriage housing by a pair of hydraulic cylinders 54 which are bolted to cross plate 53 and the piston rods 54a thereof being bolted to cross plate 49 of the spring supported upper carriage assembly. Thus, the lower carriage assembly is supported from the upper assembly but is reciprocally movable independently thereof.

The double-acting hydraulic cylinders are operated by a reversible D.C. motor 55 mounted on the lower carriage assembly. The motor 55 is operated from by switch buttons 56 and 57, the first of which will drive the lower carriage assembly downwardly and the other will raise the lower carriage assembly. Switch buttons 56 and 57 are electrically connected to a master on-off switch 58 which, in turn, is electrically connected to the electrical system of the truck. Preferably, a quick-disconnect plug-in switch (not shown) is provided on the electrical system of the truck whereby the electrical hook-up may be easily disconnected to facilitate removal of the soil sampling device from the truck.

As best shown in FIGURES 5 and 6, a spring-biased, retractable adjusting pin mechanism generally identified by numeral 59 is mounted by a bolt 60 extending through handle bar 51. A tubular sleeve 61 having a transverse finger tip handle 62 is slidably received on the end of bolt 60 between handle bar 51 and vertical guide plate 44. The tubular sleeve has a retaining pin 63 extending from the end thereof for insertion into a series of vertically spaced holes 64 in the vertical guide plate. The tubular sleeve assembly is biased toward said guide plate by a spring 65. This adjusting pin mechanism positively holds the carriage assembly 45 in an upper rest position for field and road travel and when retracted, it permits the carriage assembly 45 to be driven down manually against the tension of supporting springs 50. It also fixes the position of upper carriage assembly 46 when the lower carriage assembly 47 is to be driven downwardly or raised with the hydraulic cylinders.

As shown in FIGURES 1-3 and 7, an upright axle mounting channel 66 is welded to the cross plate 53 on the lower carriage assembly 47 for sliding engagement on guide plate 44. Channel 66 has a horizontally extending axle 67 mounted thereon for rotatably supporting a large spoke wheel generally designated 68. The hub 69 of the large spoked wheel is journalled on the axle and held thereon by a nut 70 threaded on the axle.

FIGURE 7 shows a braking assembly for providing frictional drag for holding the wheel 68 in any position that it is manually turned to and to prevent the wheel from spinning during field and road travel. The braking mechanism comprises a metal ring 71 mounted by screws 72 on inwardly extending flanges 73 on the side runners 52 of the lower carriage assembly 47. The ring is resiliently urged outwardly away from the carriage assembly by springs 74. A somewhat smaller, fibre braking ring 75 is concentrically mounted on the outer surface of ring 71. A second metal ring 76 fixedly secured to the inside of wheel hub 69 carries a second fibre braking ring 77 which mates with fibre ring 75.

Fibre ring 77 has a somewhat smaller opening therein than ring 75 and carries a smaller concentric metal electrical contact ring 78 on the inner surface thereof. The metal contact ring 78 is smaller than the opening in fibre ring 75 and extends through it for engagement with a spring-biased electrical contact 79 mounted on an adjustable supporting arm 80 attached to channel 66. Contact 79 is electrically connected to a third switch button 81 shown in FIGURE 5, which, in turn, is electrically connected to master switch box 58, shown in FIGURE 2.

Figure 8:
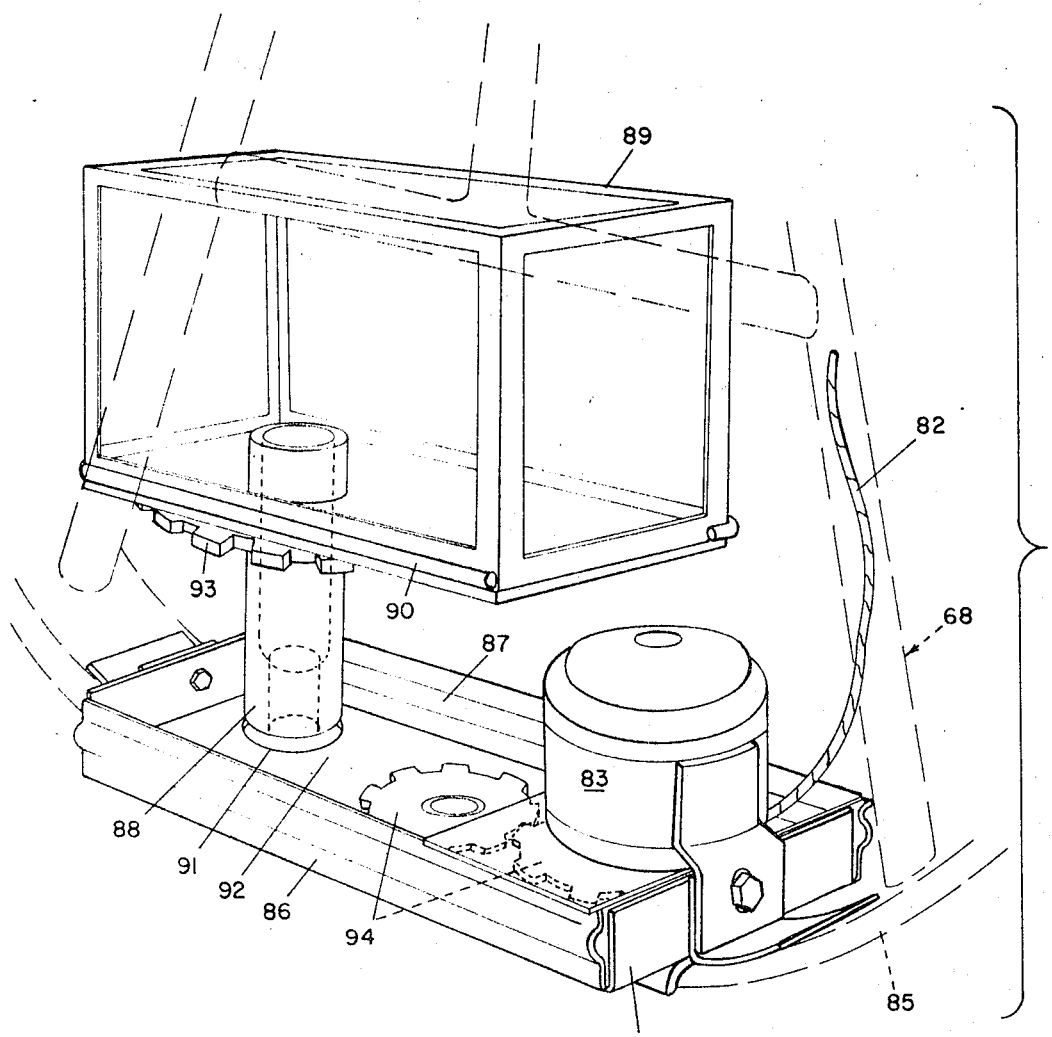
FIGURE 8 is an exploded perspective view showing a soil sample container box associated with a rotatable earth probe.

The above described sliding electrical contact assembly carries electrical power via line 82 to motor 83 for rotating the tubular boring probe assembly illustrated in FIGURES 1, 3 and 8. As shown in these figures, the probe assembly comprises a housing 84 bolted on the inside of the peripheral rim 85 of the rotatable mounting wheel 68. The housing has spring-metal sides 86 having longitudinally extending grooves 87 formed therein.

A rotatable earth probe in the form of a tubular boring tool 88 is rotatably journalled in the bottom of a transparent soil sample container box 89. The container box 89 has a pair of longitudinal rods 90 attached to the sides thereof which are adapted to be snapped into the retaining grooves in the sides of the housing 84. The tubular earth probe 88 depending from the bottom of the snap-in container box protrudes radially outward from the peripheral rim 85 of the mounting wheel 68 through a hole 91 in the base 92 of the probe assembly housing 84 and the peripheral rim of the mounting wheel. Gear 93 is welded to the earth boring probe and is driven by gears 94 mounted in housing 84.

As shown in FIGURES 1 and 3, a second earth probe assembly 95 is mounted on wheel 68 opposite the first assembly. This second assembly is similar to the first in that it has a housing 96 and a snap-in container box 97 and a tubular earth probe 98 attached to the box and extending radially outward through the peripheral rim of the mounting wheel. This probe, however, is not rotatable as is the boring probe 88 and is adapted to merely be forced downwardly into the ground to obtain the core of soil. The rotatable boring probe 88 is ordinarily used in hard, difficult to penetrate soils while the second punch-type probe assembly 95 can be used for taking core samples in softer, easier to penetrate soils.

In order to provide the driver of the truck with an unobstructed view at the exact point of the probe, as shown in FIGURE 1, a mirror 99 is mounted on section 33 of the frame 21.

As also shown in FIGURE 1, a receptacle can 100 is mounted on the upper channel beam 34 for holding a conventional soil sample bag (not shown). A funnel 101 is placed in the mouth of the bag and then set in the receptacle can.

The operation of taking a soil sample with my device will now be described. From the foregoing it should be clear that the soil core may be taken in several different ways depending on ground conditions and there are three different methods of taking a sample in addition to the method of rolling the wheel 68 along the ground to obtain a core as set forth hereinbefore. All methods may be performed in their entirety from the driver's seat of the truck cab.

The first of these additional methods is performed by the driver, with either probe assembly, by placing the palm of his hand on the handle bar 51 and withdrawing the pin 63 from guide plate 44 by squeezing handle 62 with his finger tips, thus, releasing the carriage assembly. Holding handle 62 in this retracted position, he pushes down on handle bar 51 to move both carriages 46 and 47 downwardly and consequently, manually drive the probe into the ground. When the peripheral rim of the wheel 68 engages the ground, the operator merely lets up on the handle bar 51 and the springs 50 lift the carriage assembly to withdraw the probe from the ground with the core sample therein. He then releases the handle of retaining pin mechanism 59 and drives the truck to the location where the next core will be taken. As mentioned hereinbefore, a plurality of cores are taken, usually about seven, to obtain the test sample for each five acres. As each core is taken it forces the preceding core out of the tubular probe into the container box. After the required number of cores are taken, the wheel 68 is rotated to bring the probe and container up to the top. The probe is tapped to make sure that the last core taken falls into the container box which is then snapped out of its housing and its contents, the soil sample comprising a number of core samples, poured through the funnel 101 into the soil sample bag in receptacle can 100. The bag is removed from the can and sealed and a new bag placed in the can for taking the next sample.

It should be undesrtood that if extremely powdery or stony soil is being sampled, it may be necessary to rotate wheel 68 to bring the probe up to let the core of soil fall into thtet transparent container gox after each probe is made so that it will not be lost while proceeding to the next probing location. However, the step-tapered bore in the tubular probes tends to prevent loss of the core while yet permitting easy removal of the core from the probe.

If the soil conditions are such that the operator encounters difficulty in penetrating the soil with the manual operation just described, he may choose to employ the hydraulic cylinders to push the probe into the ground. When using this method, it is generally good practice to set the carriages at such an elevation that the tip of the probe is within a few inches of the ground by using adjusting pin assembly 59. To take a core sample then, the operator merely pushes switch button 56 which extends the piston rods of the hydraulic cylinders and forces the probe into the ground. When the peripheral rim of the mounting wheel engages the ground the operator reverses the process by depressing switch button 57 which retracts the piston rods and lifts the probe out of the soil with the core sample therein. The operator then drives to the next location and repeats the button procedure to take the next core.

If the soil is very hard, the operator may decice to rotate the probe to bore it into the ground while it is being lowered. This procedure, of course, must be performed with the rotatable probe 88. Thus, when depressing switch button 56 to move the probe 88 downwardly, the operator simultaneously depresses switch button 81 which causes motor 83 to spin the probe while it is being forced into the ground to cut a core of soil. The probe is lifted out of the soil by then depressing switch button 57.

Another advantage of my invention is that the probe mounting wheel 68 can be removed from its axle and replaced with a measuring wheel for measuring the acreage in a field.

I claim:
1. Soil sampling apparatus adapted to be mounted on a motor vehicle and operated from the cab thereof, said apparatus comprising:
  (a) a frame for mounting adjacent the side of the cab of a motor vehicle,
  (b) a carriage assembly mounted on said frame for substantially vertical reciprocal movement between an upper rest position and a lower working position,
  (c) a wheel mounted on said reciprocal carriage assembly for rotation about a substantially horizontal axis.
  (d) at least one earth probe extending radially from the periphery of said wheel for penetrating the soil, and
  (e) container means on said wheel for receiving the soil sample from said earth probe.

2. The soil sampling apparatus as specified in claim 1 having spring means supporting said reciprocal carriage assembly in said frame and urging said carriage toward said upper rest position.

3. The soil sampling apparatus as specified in claim 1 having hydraulic cylinder means supporting said reciprocal carriage assembly in said frame and means for supplying fluid to said hydraulic cylinder means for driving said carriage assembly downwardly.

4. The soil sampling apparatus as specified in claim 1 wherein said reciprocal carriage assembly has an upper carriage and a lower carriage, spring means supporting said upper carriage on said frame and uging same toward said upper rest position, hydraulic cylinder means suspending said lower carriage from said upper carriage, and means for supplying fluid to said hydraulic cylinder means for driving said lower carriage downwardly.

5. The soil samplying apparatus as specified in claim 4 having adjustable means for maintaining said spring supported upper carriage in a fixed rest position in said frame.

6. The soil sampling apparatus as specified in claim 1 wherein said probe is in the form of a boring tool and having means to rotate said boring tool about its longitudinal axis for penetrating the soil.

7. The soil sampling apparatus is specified in claim 6 having a second earth probe and container means mounted on said wheel diametrically opposite said first probe.

8. The soil sampling apparatus as specified in claim 1 having a pivotable connection on said frame for swinging a portion thereof about a substantially vertical axis to and from an operating position substantially parallel to the path of travel of the vehicle.

9. The soil sampling apparatus as specified in claim 8 having detent means for releasably maintaining said portion of said frame in operating position substantially parallel to the path of travel of the vehicle.

10. The soil sampling apparatus as specified in claim 1 having a receptacle mounted on said frame for receiving the soil sample from said container means.

References Cited

UNITED STATES PATENTS

| | | |
|---|---|---|
| 2,709,368 | 5/1955 | Wolpert. |
| 2,768,570 | 10/1956 | Strid _____ 172—19 |
| 2,806,324 | 9/1957 | Ruth et al. _____ 173—19 X |
| 3,224,512 | 12/1965 | Alexander _____ 175—58 X |
| 3,264,877 | 8/1966 | Boxrud. |
| 3,324,958 | 6/1967 | Clark. |
| 3,331,249 | 7/1967 | Boxrud. |

ERNEST R. PURSER, Primary Examiner

U.S. Cl. X.R.

172—19; 175—58, 122; 73—421; 175—161; 173—152